United States Patent [19]

Ho

[11] 3,849,730

[45] Nov. 19, 1974

[54] CARRIER RECOVERY IN VESTIGIAL SIDEBAND DATA RECEIVERS

[75] Inventor: Edmond Yu-Shang Ho, Englishtown, N.J.

[73] Assignee: Bell Telephone Laboratories, Incorporated, Murray Hill, N.J.

[22] Filed: June 20, 1973

[21] Appl. No.: 371,680

[52] U.S. Cl. .................... 325/329, 325/419, 329/50

[51] Int. Cl. ............................................ H04b 1/30

[58] Field of Search ........... 325/49, 50, 60, 63, 329, 325/330, 331, 418, 419, 420, 421, 422, 423; 329/50, 122, 124

[56] References Cited

UNITED STATES PATENTS

| | | | |
|---|---|---|---|
| 3,384,824 | 5/1968 | Grenier | 325/49 |
| 3,701,023 | 10/1972 | Fang | 325/329 |

*Primary Examiner*—Benedict V. Safourek
*Attorney, Agent, or Firm*—J. P. Kearns

[57] ABSTRACT

A coherent demodulating carrier-wave recovery arrangement for a digital data communication system using vestigial-sideband amplitude-modulation techniques responds to a quadrature component only of a transmitted carrier wave. The transmitted quadrature carrier component eliminates the normal requirement for suppression of in-phase signal energy in the vicinity of zero frequency (direct current) or transmission of out-of-band pilot tones. Separate phase-locked loops control demodulating carrier frequency and phase to compensate for the transmission impairments of frequency offset and phase jitter occurring in distorting transmission channels.

4 Claims, 4 Drawing Figures

CARRIER RECOVERY IN VESTIGIAL SIDEBAND DATA RECEIVERS

FIELD OF THE INVENTION

This invention relates to demodulating carrier-wave recovery in digital data transmission systems and specifically to the coherent detection of vestigial-sideband, amplitude-modulated data signals transmitted over band-limited channels.

BACKGROUND OF THE INVENTION

Efficient use of band-limited telephone voice channels for digital data transmission is frequently assured by using vestigial-sideband amplitude modulation with synchronous or coherent detection at the receiving terminal. Two commonly observed transmission impairments, which occasion little effect on analog speech signals, become of transcendent important when digital signals are being transmitted. These impairments are frequency offset and phase jitter. Frequency offset refers to the condition wherein the demodulating carrier wave at the receiving terminal is not locked in frequency with the modulating carrier wave at the transmitting terminal. This condition upsets the harmonic relationships among the several frequency components of the transmitted signal. Phase jitter refers to the abrupt, spurious variations in phase between successive pulses as referenced to the phase of a continuous oscillation. This condition affects the precision with which sampling can be accomplished.

Typically, frequency offset is no greater than three Hz for carrier telephone channels. Phase jitter appears as a low-index angle modulation of the data signal epochs at a slowly varying rate on the order of 10 to 120 Hz. Heretofore, it has been the practice to transmit along with the data signal, pilot tones related in frequency and phase to the modulating carrier wave. The pilot tone can be the same frequency as the modulating wave. In this case low-frequency energy must be removed from the transmitted data wave and restored at the receiver to avoid interference. On the other hand, one or more pilot tones can be located at the edges of the signaling band, where no data signal energy exists. In this case excess bandwidth is required in the signaling channel.

It is an object of this invention to overcome the disadvantages of the prior art in providing a demodulating carrier wave of proper phase and frequency in a vestigial-sideband, amplitude-modulation data transmission system.

It is another object of this invention to track the transmission impairments of phase jitter and frequency offset in a vestigial-sideband, amplitude-modulated digital data system to realize smooth coherent detection without requiring band-edge pilot tones or the removal of low-frequency energy from the data signal.

It is a further object of this invention to make more efficient use of the telephone voice channel for high-speed data transmission than is provided in the prior art without materially increasing the complexity of demodulating carrier recovery systems.

SUMMARY OF THE INVENTION

According to this invention, a coherent or synchronous demodulating carrier-wave recovery arrangement for a vestigial-sideband, amplitude-modulated (VSB-AM) digital data transmission system provides continuous control of carrier phase for coherent demodulation substantially free of the distorting effects of frequency offset and phase jitter. The received signal includes a reinserted, reduced level pilot tone at the frequency of the modulating carrier wave. Due to the vestigial-sideband signal shaping the transmitted signal includes both in-phase and quadrature components of the message data wave and the carrier wave. The quadrature component of the data signal energy is suppressed in the vestigial-sideband filter without interfering with in-phase data signal energy.

At the receiving terminal a demodulating carrier wave oscillator, whose output is phase locked into quadrature relationship with respect to the modulating carrier wave, is controlled by a low-frequency component in the received wave which corresponds to the frequency offset imparted in transmission, but uncorrupted by any phase jitter. The phase jitter contribution to the received wave is separately filtered from the demodulated quadrature component and, after attenuation in proportion to the level of the pilot tone, is product modulated with the quadrature component of the locally generated carrier wave and combined with the in-phase component of the locally generated carrier wave to provide a jittered in-phase demodulating carrier wave to recover a smooth baseband data signal from the composite received signal wave. One further operation is performed to remove all trace of the transmitted pilot tone after low-pass filtering for suppression of the upper sideband and double frequency components. This further operation comprises the integration of the demodulated in-phase output and subtraction of the integrated resultant from the recovered baseband data wave. The baseband data wave is finally converted into digital form by conventional means.

An important advantage of coherent demodulation of a vestigial-sideband, amplitude-modulated data wave in accordance with this invention is that of bandwidth conservation without requiring dc removal and restoration. Instead of removing data signal energy in the vicinity of the frequency of the modulating carrier wave, the transmitted in-phase component receives conventional Nyquist shaping for intersymbol interference avoidance and only the quadrature component is subjected to high-pass filtering.

A feature of this invention is that the transmission impairments of frequency offset and phase jitter frequently encountered in voice telephone channels are compensated in substantially independent control loops.

DESCRIPTION OF THE DRAWING

The above and other objects, features and advantages of this invention will be better appreciated by a consideration of the following detailed description and the drawing in which.

DETAILED DESCRIPTION

It is well known that a digital pulse train with a random sequence of digits with discrete amplitudes $a_i$ spaced at the synchronous interval T when modulated onto a carrier wave of radian frequency $\omega_c$ and given vestigial-sideband (VSB) shaping generates a transmitted signal $s(t)$ which can be represented by a linear combination of an in-phase component (modulated onto the cosine of the carrier frequency) and a quadrature component (modulated onto the sine of the carrier frequency) as follows:

$$s(t)=\sum_i a_i g(t-iT)\cos\omega_c t+\sum_i a_i g_\beta(t-iT)\sin\omega_c t, \quad (1)$$

where $g(t)$ = overall bandlimited signal shaping with bandwidth less than the carrier frequency $\omega_c$ to avoid intersymbol interference; and $g_\beta\ (t)$ = transitional shaping within $\beta$ Hz of the carrier frequency which generates the quadrature signal component.

Figure 2:
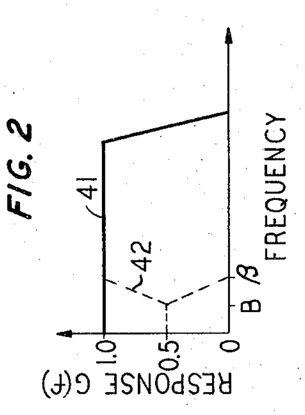
FIGS. 2, 3 and 4 are frequency spectra useful in the explanation of the operation of this invention.
Figure 3:
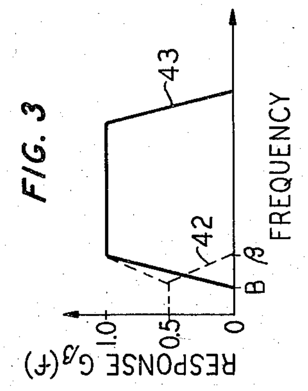

The shaping functions $g(t)$ and $g_\beta\ (t)$ are realized in a straightforward manner by respective low-pass and bandpass filters, each having an upper frequency rolloff at a sampling or data transmission frequency below the carrier frequency $\omega_c$. The upper cutoff is conventional in data transmission systems for avoidance of intersymbol interference. The data sequence $\{a_i\}$ is applied directly to the low-pass filter having the shaping factor $g(t)$. The data sequence $\{a_i\}$ is passed through a 90° allpass phase-shift circuit prior to being applied to the bandpass filter having the shaping function $g_\beta\ (t)$, which has a low-frequency rolloff at a frequency of $\beta$ Hz. The respective in-phase and quadrature-rotated data sequences, after passing through filters having the $g(t)$ and $g_\beta\ (t)$ shaping functions diagrammed in FIGS. 2 and 3, are modulated onto in-phase and quadrature-phase components of the carrier frequency in accordance with equation (1). When the modulation is balanced, it is well known that the carrier component is eliminated from the output. For the purpose of facilitating coherent demodulation, however, a pilot tone having the frequency of the carrier wave is reinserted in the composite output signal at controlled amplitude, as is explained more fully below.

The prior art use of a high-pass filter to remove direct-current energy entirely from the baseband data signal is disclosed in U.S. Pat. No. 3,152,305 issued on Oct. 6, 1964 to F. K. Becker and J. R. Davey. A direct-current restoration circuit is required at the receiving terminal when all direct-current energy is removed. According to this invention, the in-phase data signal is not subjected to low-frequency energy removal and thus no direct-current restorer is needed.

On the assumption that the frequency offset is less than $\beta$ Hz, the equation for the received signal $r(t)$ with a phase jitter component $\phi(t)$ added by the transmission channel can be derived from equation (1) by inspection.

$$r(t)=\sum_i a_i g(t-iT)\cos(\omega_c t+\varphi(t))$$
$$-\sum_i a_i g_\beta(t-iT)\sin(\omega_c t+\varphi(t)) \quad (2)$$

The phase jitter amount $\phi(t)$ is added to both in-phase and quadrature transmitted signal carrier waves by passage through the typical telephone channel. It is well known that in order to demodulate the baseband data signal wave from the received signal defined by equation (2), a demodulating carrier wave with the same jitter component is required, if distortion is to be avoided. According to this invention, a VSB data signal distorted by phase jitter as represented in equation (2) and also by frequency offset is coherently demodulated with substantially no distortion.

When frequency offset $\theta_c$ is present, equation (2) becomes $$r(t)=\sum_i a_i g(t-iT)\cos(\omega_c t+\varphi(t)+\theta_c)$$
$$-\sum_i a_i g_B(t-iT)\sin(\omega_c t+\varphi(t)+\theta_c). \quad (3)$$

By slightly increasing the complexity of the VSB shaping filter the quadrature component of the data signal energy around zero frequency ($dc$) can be substantially eliminated. On the assumption that the bandwidth of the phase jitter $\phi(t)$ is less than B Hz (B is also less than $\beta$), the shaping function $g_\beta\ (t)$ can be designed with no energy from 0 to B Hz. In practical telephone channels it has been found that phase jitter lies in the range of 60 to 120 Hz. At the same time frequency offset generally occurs in an even lower frequency range generally not over 10 Hz.

With low-frequency components below B Hz removed from the quadrature transmitted channel by the shaping of $g_\beta\ (t)$, but without affecting the bandwidth of the in-phase channel, the jittered received signal can be approximated by $c(t)$ =

$$c(t)=\left\{\sum_i a_i g(t-iT)+\phi(t)\sum_i a_i g_\beta(t-iT)\right.$$
$$\left.+A\right\}\cos(\omega_c t+\theta_c)+\left\{\sum_i a_i g_\beta(t-iT)\right.$$
$$\left.-\phi(t)\sum_i a_i g(ti-T)-A\phi(t)\right\}\sin(\omega_c t+\theta_c) \quad (4)$$

where A cos $\omega_c t$ is the transmitted pilot tone at the radian carrier frequency $\omega_c$.

It is apparent that phase jitter $\phi(t)$ appears in the quadrature channel with the coefficient of pilot-tone amplitude A. The quadrature channel baseband shaping is such that there is no transmission below B Hz, gradually increasing transmission to B Hz and full transmission above B Hz. The in-phase channel baseband shaping is flat from 0 Hz to cutoff. In-phase shaping is shown in FIG. 2 as curve 41. Quadrature shaping is shown in FIG. 3 as curve 43. Broken line traces 42 in FIGS. 2 and 3 represent the $g_\beta\ (t)$ shaping combined with the spectrum of the half-amplitude reinserted carrier component.

Figure 4:
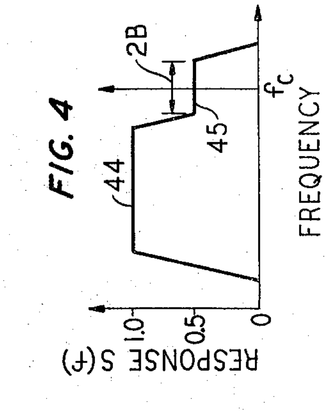
Figure 1:
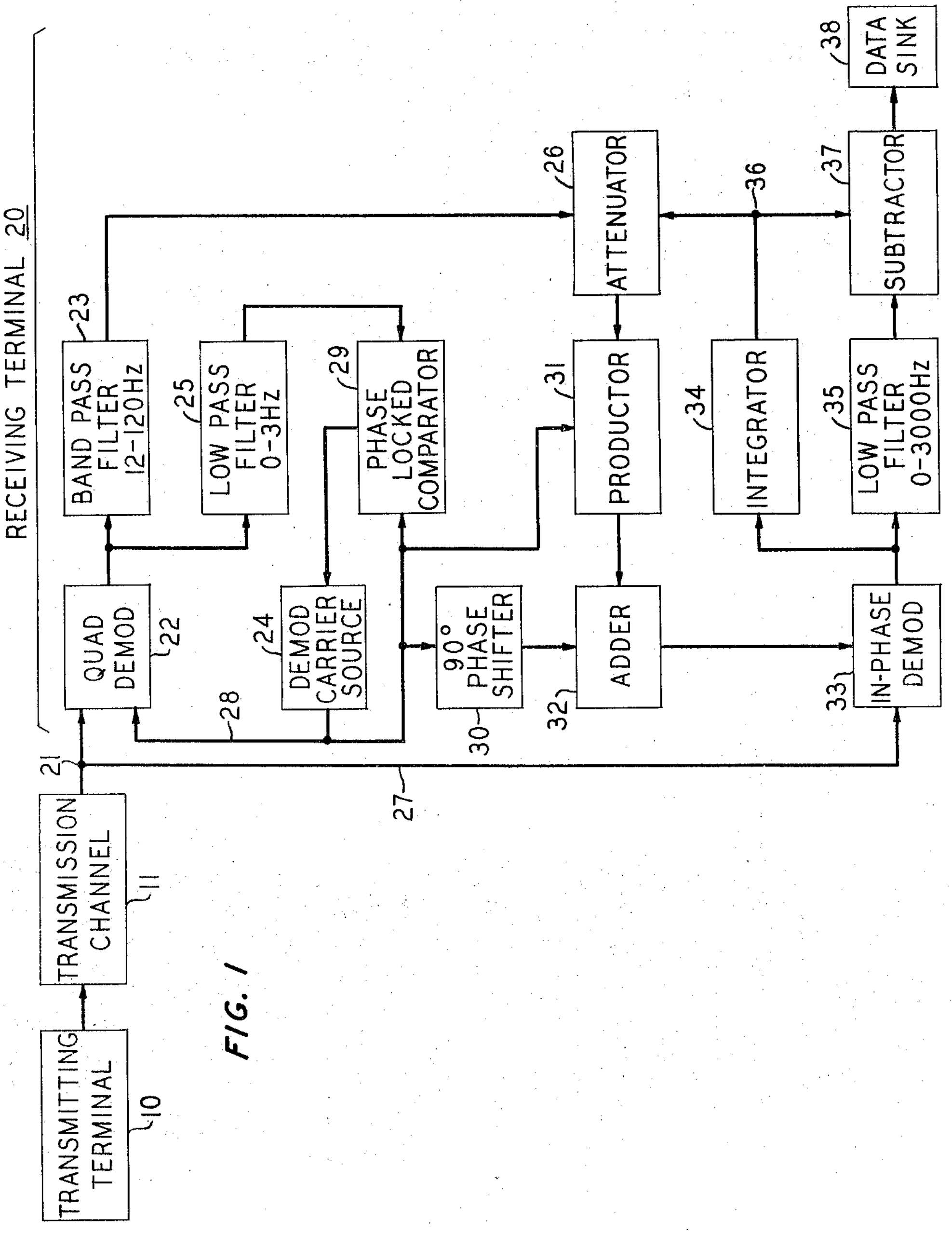
FIG. 1 is a block schematic diagram of a vestigial-sideband amplitude-modulated digital data transmission system improved by a coherent demodulator according to this invention.

FIG. 1 is a block schematic diagram of a VSB-AM digital data transmission system modified according to this invention. Digital data signals originating in transmission terminal 10 are shaped and modulated onto a carrier wave to form the channel signal shown in FIG. 4 as waveform 44 with transition step 45 of bandwidth equal to 2B Hz and an attenuated pilot tone at the carrier frequency $f_c$ at midstep. Signals having the waveform of FIG. 4 are conveyed over transmission channel 11 to receiving terminal 20.

Receiving terminal 20 comprises input point 21, quadrature demodulator 22, in-phase demodulator 33, band-pass filter 23, low-pass filter 25, phase-locked loop comparator 29, local carrier-wave source 24, quadrature phase shifter 30, productor 31, adder 32, attenuator 26, integrator 34, low-pass filter 35, subtractor 37 and data sink 38.

Quadrature demodulator 22, low-pass filter 25, phase-locked comparator 29 and carrier-wave source 24 form a tight phase-locked loop responsive to the frequency offset $\theta_c$ of the transmitted pilot tone as selected by low-pass filter 25. Comparator 29 determines the phase difference between the respective outputs of carrier-wave source 24 over lead 28 and filter 25 and generates a direct-current control signal to cause the output of carrier-wave source 24 to track the pilot tone (A cos $\omega_c t$) including narrow-band frequency offset $\theta_c$. The output of carrier-wave source 24 is in quadrature with the transmitted pilot tone, so that the control output comparator 29 is zero seeking.

The output of carrier-wave source 24 is shifted 90° in phase in phase shifter 30 to furnish an in-phase demodulating carrier wave to in-phase demodulator 33. However, the output of quadrature demodulator 22 is also filtered by bandpass filter 23 to obtain the quadrature form of phase jitter component $\omega(t)$ within the frequency range of approximately 12 to 120 Hz.

The output of filter 23 is the bracketed coefficient of the sine of the carrier wave in equation (4) shaped by the transfer characteristic of filter 23; thus $$\hat{\varphi}(t)=\left\{\sum_i a_i g_\beta(t-iT)-\varphi(t)\sum_i a_i g(t-iT)-A\varphi(t)\right\}*h_2(t), \qquad (5)$$

where $h_2(t)$ = time response of filter 23 and the asterisk indicates the convolution operation.

Since $g_\beta(t)$ contains no energy within the passband of filter 23, the first term within the bracket is zero. The second term is much smaller than the third term by at least 16 decibels due mainly to the large ratio between the data signal energy in the second term, typically occupying a bandwidth of 2,400 Hz, and the pilot tone energy in the third term, occupying no more than 60 Hz of bandwidth.

Accordingly, for practical purposes in implementing a voiceband data transmission system equation (5) can be approximated by $$\hat{\phi}(t) = -[A\phi(t)]*h_2(t) \qquad 6.$$

Equation (6) adequately defines for practical purposes the signal in the output of bandpass filter 23 to be applied to attenuator 26. Assuming for the moment that the attenuation provided by attenuator 26 is 1/A, one proceeds to multiply the pure phase-jitter component from attenuator 26 in productor 31 by the quadrature demodulating carrier wave provided over lead 28 from carrier-wave source 24. There results the phase-jitter component multiplied by the sine of the frequency of the demodulating carrier wave, including the frequency offset amount contributed by the narrow-band control loop through comparator 29.

The in-phase component of the demodulating carrier wave is obtained by passing the quadrature component through 90° phase shifter 30. To this in-phase carrier is added the phase jitter from productor 31 in adder 32. Thus, the complete demodulating carrier wave made available to in-phase demodulator 33 contains the proper frequency-offset and phase-jitter components to demodulate a substantially distortionless data signal from the received wave as required by equation (3). The double-frequency components of the demodulation process are removed in low-pass filter 35 to yield an output signal of the form $$r(t)=\frac{1}{2}\left\{\sum_i a_i g(t-iT)+\varphi(t)\sum_i a_i g_\beta(t-iT)+A+\theta_c\right\}$$
$$-\frac{1}{2}\left\{\varphi(t)\sum_i a_i g_\beta(t-iT)-\varphi^2(t)\sum_i a_i g(t-iT)-A\varphi^2(t)+\theta_c^2\right\} \qquad (7)$$

The direct-current level introduced by the presence of the pilot tone at carrier frequency is obtained by passing the output of in-phase demodulator 33 through integrator 34 to yield the value A of the pilot-tone amplitude appearing in equations (5), (6) and (7). When this value is subtracted from the output of filter 35 in subtractor 37, the resultant wave comprises the negligible second-order terms of the second-bracketed expression and the first term of the first-bracketed expression, namely:

$$\sum_i a_i g(t-iT) \qquad (8)$$

Equation (8) represents the transmitted data wave with the original band-limited shaping function $g(t)$. This analog data wave is detected and transformed into digital baseband form in data sink 38 in a conventional manner.

The output of integrator 34 is also applied to control the level of attenuator 26, whose purpose as previously given is to reduce the raw phase-jitter output of filter 23 by the amount of the pilot-tone amplitude A. Attenuator 26 can be implemented by a ladder network or by a field effect transistor, as disclosed, for example, in U.S. Pat. No. 3,447,103 issued to E. Port on May 27, 1969, particularly with reference to FIG. 4.

In summary, this invention covers a demodulating carrier recovery system for VSB-AM data systems. Direct-current restoration and excess bandwidth are avoided without the use of notch filters at the transmitting terminal. Only a reduced pilot tone at the carrier frequency is required to be transmitted in place of the two bandedge pilot tones previously employed. In-phase and quadrature components of the received signal are separately demodulated. The quadrature demodulated signal is employed in two control loops to cause a local oscillator to track the pilot tone at carrier frequency with respect to both frequency offset and phase jitter. The in-phase demodulating carrier wave is taken from the local oscillator through a 90° phase shifter and has added to it a phase-jitter component derived from the quadrature demodulation process to serve as an in-phase demodulating carrier wave. The complexity of the VSB shaping filter, which may be divided between transmitting and receiving terminals, is increased but slightly over the conventional filter to cause a steeper low-frequency roll-off in the quadrature channel only. The specific recovery system disclosed is capable of tracking phase jitter faithfully up to 60 Hz with a relatively small 38-decibel error in the recovered in-phase signal (the second-order terms of equation (7)).

It is to be understood that the embodiment shown and described in this specification is illustrative only, and that modifications may be implemented by those skilled in the art without departing from the spirit and scope of this invention.

What is claimed is:

1. A synchronous demodulating carrier-wave recovery system for a vestigial-sideband, amplitude-modulated data signal which includes a discrete carrier component and which is received over a transmission channel subject to the impairments of frequency offset and phase jitter comprising an adjustable local oscillator, a quadrature demodulator responsive to said received signal and to the output of said local oscillator, a control loop having a narrow bandwidth comparable to that of said frequency offset extending between said quadrature demodulator and said oscillator to control said oscillator, a transmission path for the output of said quadrature demodulator having a passband comparable to that of said phase jitter for isolating a phase-jitter component therein, means for multiplying said phase-jitter component by the output of said local oscillator to form a partial in-phase demodulating signal, means for combining said partial in-phase demodulating signal with a quadrature rotated output of said local oscillator to form a complete in-phase demodulating signal having both frequency-offset and phase-jitter components, and an in-phase demodulator responsive jointly to said received signal and to said complete in-phase demodulating signal to form a data output substantially free of frequency-offset and phase-jitter impairments.

2. The synchronous carrier recovery system defined in claim 1 in which said transmission path for said phase-jitter component further comprises a bandpass filter whose bandwidth is comparable to that of said phase-jitter component and an attenuator in series with said last-mentioned filter for compensating for the transmission level of said discrete carrier component.

3. The synchronous carrier recovery system of claim 1 in which an integrator operates on the output of said in-phase demodulator to derive therefrom an output corresponding in magnitude to the transmission level of the carrier-frequency component in said received signal and a subtractor jointly responsive to the outputs of said in-phase demodulator and said integrator removes the direct-current component from the output of said in-phase demodulator.

4. In combination with a vestigial-sideband, amplitude-modulated transmission system for data signals which includes a discrete carrier component shaped to exclude quadrature direct-current energy, said transmission system having a tendency to impart distorting frequency-offset and phase-jitter components to received signals, a synchronous demodulating carrier recovery arrangement comprising an in-phase demodulator;

a quadrature demodulator;

means for applying received data signals to said inphase and quadrature demodulators;

a local carrier-wave source;

a first control loop jointly controlled by said quadrature demodulator and said carrier-wave source to lock the frequency of said carrier-wave source to the discrete carrier component in received data signals, said first control loop having a narrow passband including direct current comparable to the passband of said frequency-offset component;

a second control loop jointly responsive to said quadrature demodulator and said carrier-wave source for tracking the phase-jitter component of said received signal, said second control loop having a passband not including direct current comparable to the passband of said phase-jitter component;

means included in said second control loop for multiplying together the output of said carrier-wave source with said phase-jitter component thereby producing a demodulating carrier-wave with a superposed phase-jitter component;

further means included in said second control loop for attenuating said phase-jitter component therein in accordance with the amplitude of the discrete carrier component in said received signal and for applying said attenuated phase-jitter component to said multiplying means;

means for shifting the phase of the output of said carrier-wave source by 90 electrical degrees to provide an in-phase demodulating carrier-wave;

means responsive to the output of said multiplying means for adding said superposed phase-jitter component to the in-phase demodulating carrier wave from said phase-shifting means;

means for applying the output of said adding means to said in-phase demodulator;

means for integrating the output of said in-phase demodulator to obtain the direct-current component of the demodulated received signal;

means for substituting the direct-current component obtained from said integrating means from the demodulated received signal from said in-phase demodulator; and further means for applying the direct-current output from said integrating means to said attenuating means to control the effective level of attenuation thereat.

* * * * *